United States Patent [19]
Williams

[11] Patent Number: 5,691,432
[45] Date of Patent: Nov. 25, 1997

[54] THERMAL POLYMERIZATION OF DICYCLOPENTADIENE

[75] Inventor: Theodore Joseph Williams, Panama City, Fla.

[73] Assignee: Arizona Chemical Company, Panama City, Fla.

[21] Appl. No.: 626,828

[22] Filed: Apr. 3, 1996

Related U.S. Application Data

[60] Continuation of Ser. No. 353,729, Dec. 12, 1994, abandoned, which is a division of Ser. No. 185,057, Jan. 24, 1994, Pat. No. 5,410,004.

[51] Int. Cl.$^6$ ........................................ C08F 36/04
[52] U.S. Cl. .................. 526/283; 526/347; 526/347.1; 526/340; 526/339
[58] Field of Search ........................... 526/283, 347, 526/347.1, 339, 340

[56] References Cited

U.S. PATENT DOCUMENTS

| | | | |
|---|---|---|---|
| 2,384,569 | 9/1945 | Semon . | |
| 2,559,790 | 7/1951 | Peters . | |
| 2,598,424 | 5/1952 | Peters . | |
| 2,608,550 | 8/1952 | Rowland et al. . | |
| 2,836,586 | 5/1958 | Dazzi . | |
| 3,084,147 | 4/1963 | Wilks et al. . | |
| 3,306,868 | 2/1967 | Adrian . | |
| 3,412,075 | 11/1968 | Naarmann et al. . | |
| 3,595,842 | 7/1971 | Schrage et al. . | |
| 3,717,613 | 2/1973 | Ichikawa et al. . | |
| 3,890,285 | 6/1975 | Sumita et al. . | |
| 3,940,372 | 2/1976 | Hergenrother . | |
| 3,957,736 | 5/1976 | Tsuchiya et al. ............ 526/11.1 | |
| 3,984,381 | 10/1976 | Tsuchiya et al. . | |
| 4,010,130 | 3/1977 | Matsuo . | |
| 4,028,119 | 6/1977 | Yamada ........................ 106/32 | |
| 4,064,337 | 12/1977 | Uraneck et al. ............... 526/204 | |
| 4,080,491 | 3/1978 | Kobayashi et al. ........... 526/137 | |
| 4,102,667 | 7/1978 | Robinson et al. ............... 71/3 | |
| 4,110,311 | 8/1978 | Cooper et al. ................. 528/215 | |
| 4,125,481 | 11/1978 | Uraneck et al. ............... 252/431 | |
| 4,126,739 | 11/1978 | Hoene et al. .................. 526/272 | |
| 4,212,783 | 7/1980 | Sato et al. .................... 260/29.6 | |
| 4,317,753 | 3/1982 | Tsuchiya et al. .............. 524/504 | |
| 4,533,700 | 8/1985 | Mizui et al. ................... 525/285 | |
| 4,574,057 | 3/1986 | Kaza et al. . | |
| 4,650,829 | 3/1987 | Bossaert et al. ............... 525/99 | |
| 4,716,207 | 12/1987 | Cozewith et al. ............. 526/169.2 | |
| 4,923,943 | 5/1990 | Hara et al. .................... 526/283 | |
| 4,927,738 | 5/1990 | Iwanaga et al. ............... 430/286 | |
| 4,933,402 | 6/1990 | Matlack ........................ 526/189 | |
| 4,968,764 | 11/1990 | Hayashida et al. ............ 526/283 | |
| 4,976,783 | 12/1990 | Werner ......................... 106/20 | |
| 4,985,513 | 1/1991 | Iwanaga et al. ............... 526/80 | |
| 5,077,361 | 12/1991 | Hughes et al. ................. 526/233 | |
| 5,081,208 | 1/1992 | Sjardijn ........................ 526/166 | |
| 5,109,081 | 4/1992 | Pannell et al. ................. 526/68 | |
| 5,171,793 | 12/1992 | Johnson et al. ............... 525/332.1 | |
| 5,212,043 | 5/1993 | Yamamoto et al. ............ 430/192 | |

OTHER PUBLICATIONS

Dicyclopentadiene System Petroleum Resins, by Tsuchiya, et al. *Journal of the Japan Petroleum Institute*, 27(1):26–30 (1984).

*Primary Examiner*—Fred Zitomer
*Attorney, Agent, or Firm*—Luedeka, Neely & Graham, P.C.

[57] ABSTRACT

The specification discloses a method for making DCPD based resins that have relatively narrow molecular weight distributions. The method comprises thermally polymerizing dicyclopentadiene monomer in the presence of one or more strong acids, preferably with an olefinic modifier, to provide a dicyclopentadiene oligomer. Optionally, an organic sulfur species can also be used to further effect molecular weight control. For end-use performance in inks, adhesives, coatings and other related areas, the invention provides dicyclopentadiene oligomer resins having weight average molecular weights less than 1000 and relatively narrow molecular weight distributions, as measured by a polydispersity index, of less than about 2.3. Among the strong acids that are effective for controlling molecular weight, hypophosphorous acid is preferred because it gives light colored resins.

23 Claims, 2 Drawing Sheets

THERMAL POLYMERIZATION OF DICYCLOPENTADIENE

This is a continuation of application Ser. No. 08/353,729, filed on Dec. 12, 1994, abandoned, which is a division of application Serial No. 08/185,057, filed on Jan. 24, 1994, now U.S. Pat. No. 5,410,004, which issued Apr. 25, 1995.

FIELD OF THE INVENTION

This invention relates to methods for controlling the molecular weight, molecular weight distribution and color of resins prepared from dicyclopentadiene (DCPD) monomer by thermal polymerization processes, to resins produced by such methods and products including resins.

BACKGROUND OF THE INVENTION

Adhesives, inks and coatings are typically blended formulations consisting of high molecular weight polymers, resins, oils, waxes, pigments, solvents and other additives. In all of these formulations, it is well documented that the resins are major and crucial components needed to impart the formulation rheology and end-use performance characteristics. It is also well documented that resin molecular weight and molecular weight distribution, taken in combination with a resin's solubility characteristics, affect resin performance and the properties of products incorporating the resin. In general, in accordance with well accepted theory, resins having lower molecular weights have better compatibility and solubility properties relative to those having higher molecular weights for use in the above and other formulations. It is for these reasons that resins containing high molecular weight fractions do not work well in adhesive formulations. Also, the resins used for ink pigment flushing give better pigment wetting and therefore better flushing performance if they have a low average molecular weight and are free of a high molecular weight fraction. Thus, control of molecular weight and molecular weight distribution is important in the creation of high utility resin products.

It is to be noted that a reference to the molecular weight of a resin or polymer, in reality, is a reference to an average molecular weight because, with few exceptions, polymers are complex mixtures of molecules having different molecular weights. The mixture of different molecular weights is called polydispersity. The reason for polydispersity relates to the statistical variations inherent to polymerization processes and the purity of raw materials. The following mathematical expressions define the three different molecular weight averages that are routinely used to characterize resins and polymers:

$M_n$=number average molecular weight=$\Sigma N_i W_i/\Sigma N_i$, $M_w$=weight average molecular weight=$\Sigma N_i W_i^2/\Sigma N_i W_i$, $M_z$=z average molecular weight=$\Sigma N_i W_i^3/\Sigma N_i W_i^2$, where $N_i$ is the number or moles of a material having a molecular weight of $W_i$.

The ratio of $M_w/M_n$, defined as the polydispersity index (PDI), is a measure of the heterogeneity of a polymer sample with respect to molecular weight. The greater the value of PDI, the greater the heterogeneity or "broadness" of molecular weight distribution. A truly monodispersed system has, by definition, a PDI of 1.0. The closer the PDI of a given polymer approaches the theoretical limiting value of 1.0, the narrower is its molecular weight distribution.

As can be seen from the above equations, the z average molecular weight emphasizes the highest molecular weight fraction of the polymeric sample. Accordingly, those resins having relatively low z average molecular weights are believed to exhibit better overall formulated performance characteristics.

Average molecular weight and molecular weight distribution data is typically determined by gel permeation chromatography (GPC). This technique, in combination with calculations made against the retention times determined for a series of primary molecular weight standards, affords a means of determining all of the aforementioned average molecular weights.

The thermal polymerization of dicyclopentadiene (DCPD) and modified DCPD monomer streams is commonly practiced. These resins find wide utility in the preparation of inks, adhesives and coatings, but their relatively low overall performance excludes their use in the high performance applications. A principal motivation for using DCPD resins is low cost and availability. Their limitation, for many applications, is that in spite of the use of modifiers, the resulting resins still contain a significant proportion of high molecular weight polymer. This high molecular weight fraction limits solubility and compatibility and ultimately the utility of the resins. These resins also typically have dark colors.

Limited solubility and compatibility severely restricts the use of the existing thermally polymerized DCPD-based resins in many potential applications. Substantial concentrations of olefinic, vinyl aromatic or other reactive modifiers, when used in combination with short polymerization times, limits the proportion of undesirable high molecular weight material in a resin. However the inherent disadvantage of this approach is that it gives low resin yields. U. S. Pat. No. 4,650,829 discloses such a short reaction time and low reaction temperature polymerization of dilute DCPD streams. While it does afford the desired low molecular weight resins, it would be expected to give low yields. Another major disadvantage to using DCPD, and in particular the commercially available DCPD streams, which can contain significant proportions of the vinyl aromatics modifiers, is that they give dark colored resins. Resins having Gardner colors of greater than about 7 are generally unacceptable for adhesive and coating applications. U.S. Pat. No. 5,171,793 also discloses conditions where short polymerization times, in combination with high concentrations of reactive modifiers, result in resins with desirable molecular weights, but unfortunately the yields are low and the final resins have very dark colors. The resins of this patent generally have Gardner 16 colors and require hydrogenation processes to produce the light colors required for adhesives.

The present invention provides a method for preparing resins having relatively low molecular weights and relatively narrow molecular weight distributions. The invention also provides a method for preparing resins having light colors acceptable for use in a wide range of adhesive applications. Furthermore, the invention provides resins which exhibit good performance in hot-melt and pressure sensitive adhesives. The invention further provides improved resins for pigment flushing applications and lithographic gel varnish printing ink applications.

SUMMARY OF THE INVENTION

In general, the present invention relates to a method for producing a thermally polymerized dicyclopentadiene resin which comprises heating a reaction material including a cyclopentadiene and/or dicyclopentadiene (DCPD) monomer, preferably under autogenous pressure, at a temperature in the range of from about 240° C. to about 320° C. in the presence of one or more strong acids, alone or in combination with olefinic modifiers, for a time sufficient to produce a dicyclopentadiene oligomer resin which exhibits a weight average molecular weight in the range of from about 260 to about 1000 and a polydispersity index of less than about 2.3. In the preferred method, organic sulfur compounds are also present in the reaction material for molecular weight control. The invention may be practiced in either a continuous or batch reaction mode and with or without inert diluent being present. The reaction times may range from about 1 to about 40 hours, preferably from about 4 to about 20 hours.

After the high temperature polymerization reaction is complete, the crude reaction product is worked up. The work-up consists of standard physical distillation and stripping operations at temperatures designed to be significantly below the reaction temperature. The objective of the stripping operation is to remove inert solvent, unreacted monomer, modifiers and reaction product oils.

Commercial DCPD fractions for use in the invention are available from petroleum refining exhibiting a purity from 40% to essentially pure monomer. In the practice of the invention olefinic material, present as mono-olefins, di-olefins, vinylaromatics, co-dimers, and others, are believed to act synergistically with a strong acid as a molecular weight modifier producing polymers of dicyclopentadiene of very low polydispersity indexes. These olefins can be introduced either by carefully selecting one of the less pure commercially available DCPD products and/or by intentionally blending DCPD with the olefinic modifiers to prepare the polymerization feed stream.

Strong mineral acids and/or strong organic acids may be added in the range of from about 0.05 wt. % to about 0.5 wt. %. Hypophosphorous acid is the preferred acid for use in the invention as it has been observed to yield very light resins exhibiting. improved molecular weight characteristics.

The organic sulfur compounds are typically added in the range of 0.1 wt. % to 0.5 wt. %. In a typical use of the present invention, the organic sulfur compound may be selected from the group consisting of isopropyl mercaptan, thiophenol, thiosalicylic acid, 2,6-tert-butylphenol-4-thiol, phenyldisulfide, nonylphenol disulfide oligomer, di-(3,5-tert-butylphen-3-ol)disulfide, thiobis-β-naphthol, tetramethylthiuram disulfide, a mixture of 3,5-tert-butylphen-3-olsulfide, di-(3,5-tert-butylphen-3-ol)disulfide, di-(3,5-tert-butylphen-3-ol)trisulfide, and di-(3,5-tert-butylphen-3-ol)tetrasulfide and mixtures of those organic sulfides.

Final resin colors for the dicyclopentadiene oligomers of the invention advantageously lie in the range of from about 3 to 7, rendering the resins useful in a wide range of applications without the need for further processing to achieve a desired final color.

The relatively narrow molecular weight distribution and light final color of the resins of the present invention are of significant benefit in adhesive, ink, coating and related applications. In particular, the invention is useful in the formulation of hot-melt and pressure sensitive adhesives, as well as pigment flushing and gelled ink varnishes.

BRIEF DESCRIPTION OF THE DRAWINGS

Various embodiments of the invention will now be described in further detail in the following specification in conjunction with the accompanying drawings in which.

DETAILED DESCRIPTION OF THE INVENTION

The present invention relates to the preparation of light colored, narrow molecular weight range resins by a process which involves the thermal polymerization of dicyclopentadiene monomer. Most advantageously dicyclopentadiene monomer, containing olefinic modifiers in combination with strong acid and optionally organic sulfur compounds is used. The strong acid way be present at relatively low concentrations (typically from about 0.025 wt. % to about 0.6 wt. %, but not limited to these values). The strong acid is preferably selected from the group consisting of hypophosphorous acid, para-toluenesulfonic acid, methanesulfonic acid, hydrochloric acid, iodine, phosphoric acid and sulfuric acid. Without being bound by theory, it is believed that the iodine acts as hydroiodic acid (HI). It is believed that any Bronsted Acid may be used in the present invention. A Bronsted Acid is an acid capable of giving up protons. As used herein, the term "strong" in reference to the acidic component indicates a relatively strong proton donor.

Figure 1A:
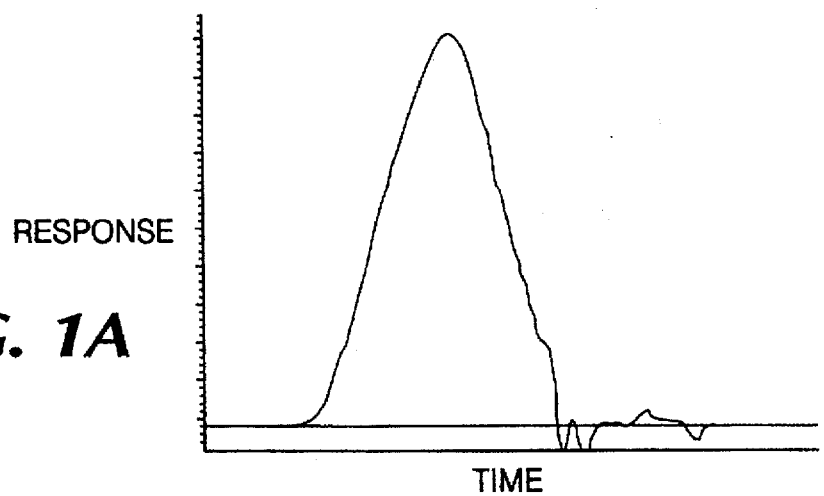
FIG. 1 is a graphical illustration which shows gel permeation chromatography (GPC) traces for dicyclopentadiene resins prepared according to the present invention using a strong acid during the thermal polymerization of the dicyclopentadiene with an olefinic monomer or mixture of monomers (FIG. 1A and FIG. 1B), and for a dicyclopentadiene resin prepared without a strong acid during the thermal polymerization of the dicyclopentadiene with an olefinic monomer (FIG. 1C)
Figure 1B:
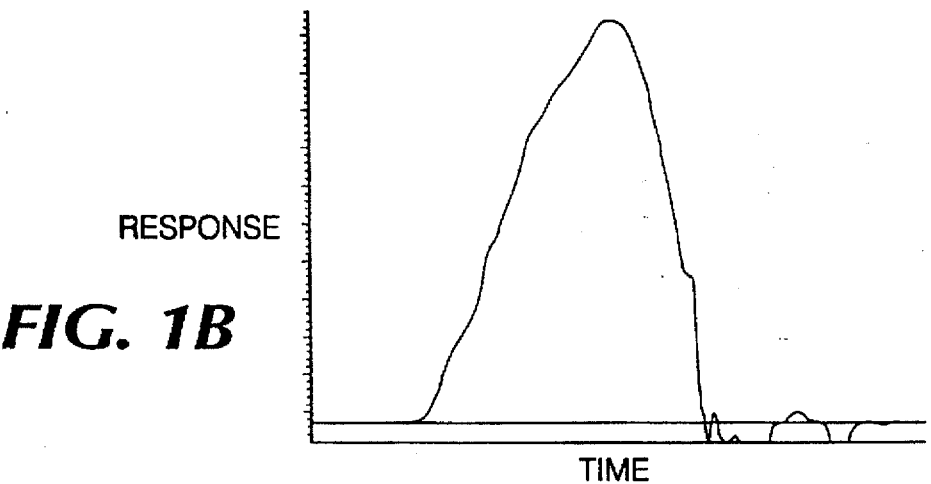
Figure 1C:
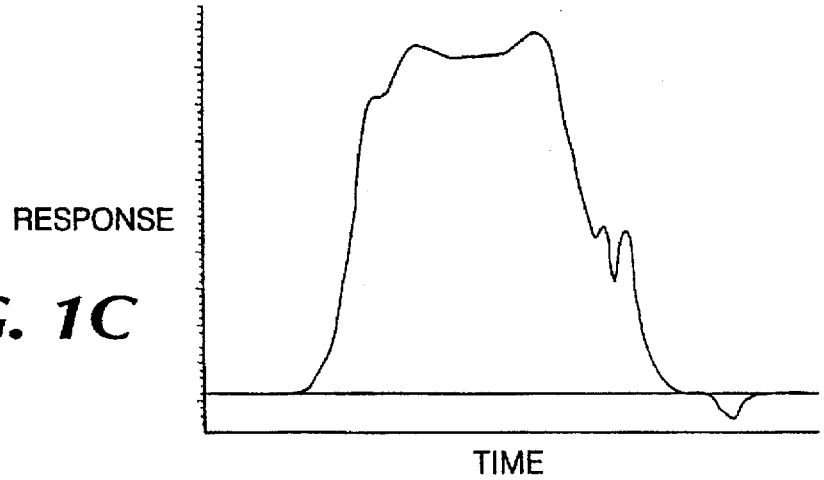
Figure 2A:
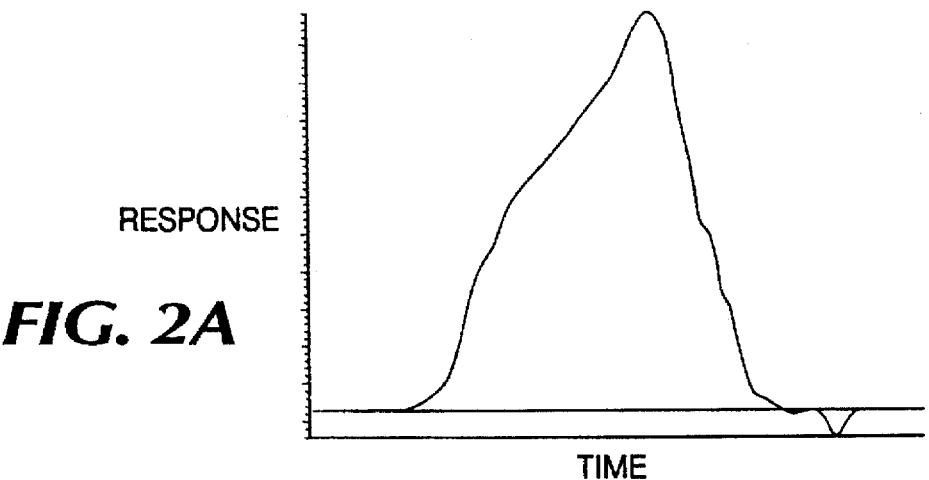
FIG. 2 is a graphical illustration which shows gel permeation chromatography (CPC) traces for a dicyclopentadiene resin prepared according to the present invention using a mineral acid during the thermal polymerization of dicyclopentadiene with piperylene and styrene (FIG. 2A), and for a dicyclopentadiene resin prepared according to the present invention using a strong acid and an organic sulfide during the thermal polymerization of the dicyclopentadiene with piperylene and styrene (FIG. 2B and 2C).
Figure 2B:
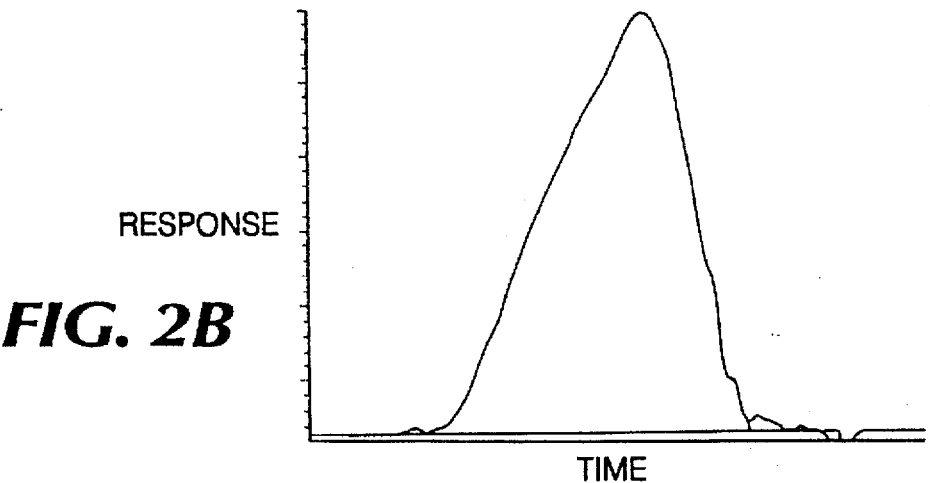
Figure 2C:
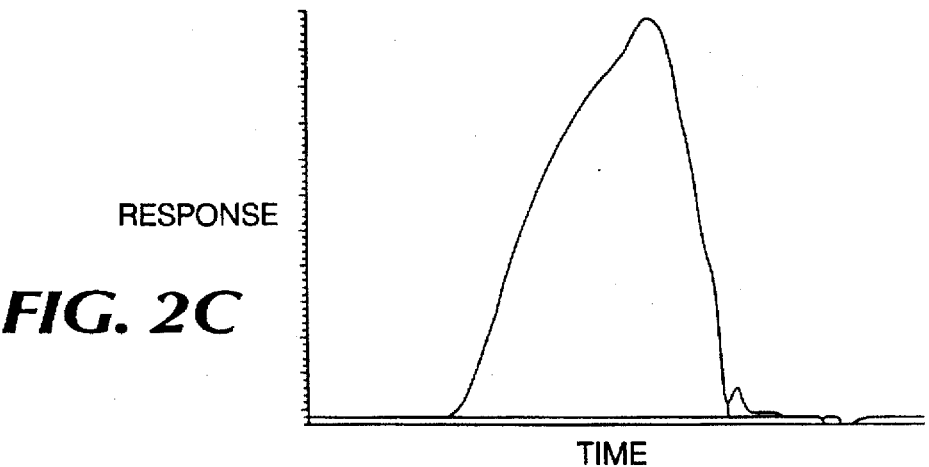

Although each of these acids are effectively used alone in the thermal polymerization process, mixtures of the acids are also suitable for preparing DCPD resins having both good color and good molecular weight characteristics. For example, a mixture of hypophosphorous acid (at a concentration of about 0.1 wt. %) and para-toluenesulfonic acid (at a concentration of about 0.05 wt. %) may be used to prepare a resin of DCPD, piperylene and styrene. (See FIG. 2A).

At concentrations below about 0.025%, the strong acid may be less effective at controlling the resin's molecular weight distribution, although the effect can only be completely diminished if no strong acid is present. At concentrations above about 1.0%, there may be little additional improvement in the product's molecular weight or molecular weight distribution.

In end use formulations or other situations where a trace of residual strong acid may not be acceptable, the residual strong acid in the resin may be removed by neutralization with a suitable base. The neutralized resin may be filtered or otherwise treated to remove the trace of salt formed by the neutralization.

In accordance with one embodiment of the present invention, an organic sulfur compound may be used in combination with the strong acid to further improve the molecular weight characteristics of the polymerization product. Effective organic sulfur compounds which may be used include substituted phenol polysulfides, aliphatic mercaptans, aromatic mercaptans and aliphatic/aromatic or mixed sulfides, but this listing is illustrative only and other organic sulfur compounds may be found to be useful in the invention. Commercially available and preferred species include the phenolic poly-or disulfide products sold under the trade names ETHANOX 323 (Ethyl Corporation), VULTAC 2 (Pennwalt) and SANTOWHITE CRYSTALS (Monsanto).

It is preferred that the starting material of the present invention contain a minimum of 40 wt. % dicyclopentadiene (DCPD) monomer. Inexpensive commercially available DCPD concentrates typically range from 50 wt. % to 90 wt. % DCPD and therefore are most preferred, although the very high purity DCPD blended with olefinic modifiers functions well. To generate the lightest final resin color, it is preferred that the DCPD stream be substantially clear, bright and colorless. Dark colored streams do not generally afford light final resin colors, but the molecular weight controlling effect of the present invention is not generally affected by starting material's initial color. Hydrogenation may be used to decolorize dark final resin color, but a distinct advantage of the invention is that the need for hydrogenation is greatly curtailed or eliminated.

The method of the present invention is effective for controlling the molecular weight distribution of the resin from pure DCPD monomer or for resin made from DCPD containing up to about 40 wt. % of olefinic modifiers (based on reactive content). The olefinic modifier may be naturally present as it is in certain commercial DCPD fractions and/or by preparing blends.

In the present invention, it is preferred that the olefin modifier, if used, be selected from the group consisting of ethylene, propylene, 1-butene, isobutylene, butadiene, 1-pentene, 1-hexene, 2-methyl-2-butene, isoprene, 1,3-pentadiene (piperylene), 1-octene, limonene, α-pinene, β-pinene, styrene, vinyl toluene, α-methyl styrene, indene, methyl methacrylate, acrylic acid or mixtures of those olefins, but other olefins may be used. An olefinic modifier is defined to be any material containing one or more carbon to carbon double bonds. This definition only excludes dicyclopentadiene monomer itself.

Because of their lower cost, the preferred olefinic modifiers are frequently those which occur naturally in some commercially available DCPD products. In the terms of modifier performance it must be emphasized that those modifiers added intentionally, such as ethylene, propylene, piperylene, styrene etc., are completely acceptable and in some ways they can afford better modification.

It is believed that the presence of a strong acid together with an olefinic compound contributes to a synergistic effect in producing the narrow range low molecular weight DCPD oligomers of the invention.

The thermal reaction process for the polymerization of DCPD or mixed DCPD streams has been thoroughly described in the patent literature and it is routinely practiced by several manufactures. Typical batch polymerizations, as described in U.S. Pat. No. 4,010,130, are mechanically entirely suitable to practice the present invention. The chemistry of the present invention is believed to be relatively independent of the mode of polymerization and may therefore be practiced in either batch or continuous reaction process, both with or without inert diluent being present.

The reaction temperature may generally range from about 240° C. to about 320° C., but most preferably it should be in the range of from about 250° C. to about 270° C. The residence time at reaction temperature may be up to about 40 hours, but most preferably it is from about 4 hours to about 20 hours.

Isolating the resins of the present invention from the crude reaction product involves techniques and physical distillation and stripping processes which are well known to those skilled in the art. Normally, by design the work-up temperature is significantly lower than the reaction temperature (normally at least 20° C. lower).

The molecular weight distribution of the preferred resins, as defined by polydispersity index (PDI), is typically less than 2.4. Preferred resins produced according to the invention exhibit PDI values less than 2.0.

The resins of the present invention are characterized generally as oligomers of dicyclopentadiene, having a weight average molecular weight of less than about 1000 and a polydispersity index which is preferably less than about 2.3. Thus, the structure of the polymer may contain less than about 8 dicyclopentadiene units, and at the preferred weight average molecular weight range of from about 250 to about 700 may have from 2 to 6 dicyclopentadiene units. It will be appreciated that resins produced according to the present invention advantageously exhibit $M_w$ values of less than about 700, whereas resins prepared without the use of mineral acids in the thermal polymerization of dicyclopentadiene exhibit $M_w$ values greater than about 1000. The $M_z$ value for the resins of the present invention are typically less than 1,500. By comparison, the $M_z$ value for control resins prepared without a strong acid and/or organic sulfur species are of the order of 2,500.

In the embodiments of the invention which involve polymerization of dicyclopentadiene along with an olefinic compound, the olefinic compound is believed to enter into the chain of pentadiene units so that the total weight average molecular weight remains below about 1000 and a very narrow spread of molecular weights is achieved. It is believed that the strong acid and, if used, the organic sulfur compound, act catalytically in the formation of the oligomer to limit the weight average molecular weight and to control the polydispersity of the resulting material.

There are many types of adhesives used commercially, including water borne, solvent borne, reactive and hot-melt types. The resins of the present invention are believed to be useful in all of these basic systems. The type of adhesive chosen for a particular application is dependent on the requirements of the application. The examples provided here involve two of the largest general types, "hot-melt" and "pressure sensitive" adhesives.

Hot-melt adhesives are generally composed of ethylene and ethylenically unsaturated ester based elastomers, formulated with one or more resins (tackifiers), waxes and/or oils. Examples of the elastomers used in the present examples include ethylene-vinyl acetate (EVA) copolymers and ethylene-acrylate copolymers. Obviously a multitude of different formulated adhesives can be based on the same general components. Commercially, the ethylene-vinyl acetate polymers have extensive utility. With these amorphous elastomers, the wax is present to both control molten adhesive viscosity, for ease of handling, as well as to allow the adhesive to set once it cools. The wax crystallizes and the crystals act to physically reinforce and set the adhesive bond.

Existing standard tackifiers embody a range of resins including all of those resins that are available from the rosin ester, hydrocarbon resin and terpene resin families. The conventional thermal hydrocarbon resins and its technology is included within the above families but they have relatively poor polymer compatibility and therefore they are limited to use in low performance adhesive application.

Pressure sensitive adhesives are typically comprised of blends that include polymer, tackifier resin and optionally, mineral oil components. The polymer may include any of a number of different types of elastomers, but frequently involves a block copolymer thermoplastic elastomer. Typically these block copolymers are composed of homopolystyrene "blocks" or segments, A, and a hydrocarbon segment, B, resulting in an A-B-A block structure. The styrene content may vary as well as the hydrocarbon segment placement. Typically the hydrocarbon segment is derived from isoprene, butadiene, hydrogenated butadiene or combinations of these or other hydrocarbon monomers. They can, in addition to the traditional linear configuration as previously described, have branched or radial configurations. Again there is a myriad of different products commercially available and their specific uses are highly dependent on the application requirements.

Oil may be used to plasticize the adhesive system. Generally speaking, the plasticizing process lowers the system's glass transition temperature ($T_g$) and reduces the strength properties of the polymer. The tackifier resin component is typically from the very general group consisting of hydrocarbon resin, terpene resin or rosin ester. The resin affords the tack properties needed for the bond formation process. The resin component must typically have good compatibility in order to generate the desired adhesive and cohesive properties.

The present invention provides resins which are highly compatible with ethylene-unsaturated ester copolymers used for hot melt adhesives and which exhibit utility in block copolymer derived pressure sensitive adhesive applications.

Printing inks, in a very general sense, are combinations of pigment, binder and solvent. The binder serves to provide toughness and adhere the pigment to the substrate surface. The solvent serves as a means of applying the pigment, and the ink dries when solvent either evaporates, oxidizes and/or penetrates into the substrate.

Lithographic printing is one of the three most commonly used printing processes. For lithographic printing a high boiling aliphatic and/or a fatty acid derived ester solvent is often used. Compatibility of the binder resin system with the solvent is an important performance requirement.

The pigment may be introduced into a lithographic ink by either dispersing dry pigment into the binder/solvent mixture by means of high shear mixing, or by the preferred means of pigment "flushing". Ink pigments are synthesized by techniques that ultimately result in a hydrated pigment mass termed "press-cake." Flushing involves displacing the water by intensive mixing in the presence of a varnish typically consisting of a high solubility resin and ink solvent. This in effect "flushes" the water from the pigment resulting in a pigment dispersion in varnish.

Commercial lithographic printing inks are typically constructed from a gelled varnish and the flushed pigment dispersion. In order to achieve acceptable performance on the printing press, the ink system must have certain rheological characteristics. The desired rheological characteristics are imparted by the gelled varnish. The gelled varnish rheological characteristics are often achieved by the addition of aluminum-based gelling agents which react with the resins of the varnish systems.

The gellable lithographic varnishes are typically composed of several resins, often a high molecular weight resin and a low molecular weight resin. The high molecular weight polymer is the species desired to react with the gelling agent to achieve the proper rheology. The low molecular weight resin is used to "solubilize" the system so that a homogeneous mixture results. Typically the low molecular weight resin interferes with the formation of the proper rheology by dilution, and therefore has a dilatory effect.

The present invention provides resins having good utility for pigment flushing and more specifically resins which provide improved final printed ink gloss. Resins according to the invention exhibit exceptionally good solubility properties in ink formulations and exceptionally good varnish gel reactivity.

Thus, the commercial uses for resins produced according to the present invention include, but are not limited to, adhesive, ink and varnish formulations. For example, the resins of the invention may also be used as "green tack" promoters in rubber processing for improving the properties and handling characteristics of the material prior to vulcanization.

The invention will now be further described with reference to the following examples which are intended to illustrate, but not to limit, the invention.

EXAMPLE I

An autoclave reactor equipped with external heating, cooling, agitation and pressure capabilities was charged with 1075 grams DCPD concentrate (83 wt. % DCPD by weight, 15 wt. % codimers), 375 grams of piperylene concentrate (70 wt. % cis and trans 1, 3 pentadiene by weight), 75 grams of styrene, 3 grams of hypophosphorous acid (50% aqueous solution) and 0.75 grams of para-toluenesulfonic acid.

The autoclave was sealed and heated to 265° C. over a 1 hour period of time. Once the 265° C. temperature was reached, the autoclave was cooled as necessary to maintain a temperature of 265° C. for a period of 4 hours. The autoclave was then cooled to 120° C. and the reaction product discharged, under an inert atmosphere, for work-up. The reaction product was a pale yellow viscous semi-solid.

A 1375 gram sample of the reaction product was transferred to a three-neck round bottom flask which was equipped with a nitrogen inlet/thermometer adaptor, an agitator assembly, a steam sparge line and a take-off/condenser system. The reaction product was slowly heated to 240° C. under a nitrogen blanket. Once the 240° C. temperature was reached, the reaction product was steam sparged to remove residual monomer and reaction oils. The sparging was continued until the resin softening point of about 100° C. was reached. The finished resin was cooled to 180° C. and discharged into an appropriate container.

The final resin had the following properties:

| | |
|---|---|
| Softening Point, R&B | 99° C. |
| Gardner Color, Neat | 5+ |
| Resin Yield, % | 83% |
| Molecular Weight[1] | |
| $M_n$ | 339 |
| $M_w$ | 620 |
| $M_z$ | 1387 |
| PDI | 1.8 |
| Cloud Point[2] | 73° C. |

[1] Molecular Weights by GPC
[2] 2:2:1 EVA ELVAX 250/Microcrystalline Wax/Resin

EXAMPLE II

Comparison Example

The same proportion of starting materials as used in EXAMPLE I with the exclusion of the strong acids were charged into an autoclave and reacted as per EXAMPLE I. The reaction product was sparged to the desired 100° C. softening point using the method of EXAMPLE I.

The finished comparison resin had the following properties:

| | |
|---|---|
| Softening Point, R&B | 99° C. |
| Gardner Color, Neat | 8+ |
| Resin Yield, % | 87% |
| Molecular Weight | |
| $M_n$ | 427 |
| $M_w$ | 1028 |
| $M_z$ | 2515 |
| PDI | 2.4 |
| Cloud Point | 100° C. |

The resin produced without the strong acid was much darker, 3 Gardner color numbers, than the resin produced according to the method of the present invention. The cloud point, as a relative measure of compatibility, of the resin of EXAMPLE I indicates improved compatibility relative to the resin of comparative EXAMPLE II. The resin of EXAMPLE I resulted in a final resin $M_w$ and $M_z$ of 620 and 1389, respectively, versus 1028 and 2515, respectively, for the resin of comparative EXAMPLE II. Thus, the present invention affords a means of improving color and molecular weight distribution relative to a resin preparation of the previous art.

EXAMPLES III–XV

A series of thermally polymerized dicyclopentadiene resins were prepared with varying amount of DCPD, olefinic monomer(s), strong acid(s) and optionally organic sulfur containing species. The amounts of the reaction materials are given in TABLES I and II. The reaction conditions were similar to the conditions of EXAMPLES I and II. The reaction conditions and yields are given in TABLES III and IV. After the initial reaction, the reaction mixture was stripped with a nitrogen sparge at 230° C. The characteristics of the final resin are given in TABLES V and VI.

TABLE I

| Example | III | IV | V | VI | VII | VIII | IX |
|---|---|---|---|---|---|---|---|
| MW Control Package | 0.10% Hypo A 0.05% PTSA | 0.10% Hypo A 0.05% PTSA 0.3% E-323 | 0.10% Hypo A 0.05% PTSA E-323 | 0.10% Hypo A 0.05% PTSA 0.3% E-323 | 0.05% PTSA 0.3% E-323 | 0.10% Hypo A 0.05% PTSA 0.3% E-323 | 0.05% Hypo A 0.05% PTSA 0.3% E-323 |
| Monomer DCPD | | | | | | | |
| A | | | | | | | |
| B | 95.3 | 75.0 | 80.0 | 70.0 | 77.5 | 77.5 | 77.5 |
| C | | | | | | | |
| Modifier | | | | | | | |
| Piperylene | | 10.0 | 5.0 | 30.0 | 22.5 | 22.5 | 22.5 |
| Styrene | | | 15.0 | | | | |
| Propylene | 3.0 | | | | | | |
| Ethylene | 1.7 | | | | | | |
| 1-Octene | | | 15.0 | | | | |

Hypo A = Hypophosphorous Acid
E-323 = ETHANOX 323 (Ethyl Corporation)
PTSA = para-Toluenesulfonic acid
DCPD A = ~95% DCPD, 5% codimers
DCPD B = ~83% DCPD, 15% codimers (modifier)
DCPD C = ~60% DCPD, 15% codimers, 12% Vinyl Aromatic

TABLE II

| Examples | X | XI | XII | XIII | XIV | XV |
|---|---|---|---|---|---|---|
| MW Control Package | 0.2% Hypo A 0.05% PTSA 0.3% E-323 | 0.1% Hypo A 0.05% PTSA 0.3% | 0.1% Hypo A 0.05% PTSA 0.3% 0-M | 0.1% Hypo A 0.05% PTSA 0.3% E-323 | 0.1% Hypo A 0.05% Iodine 0.3% E-323 | 0.05% Hypo A 0.05% PTSA 0.3% E-323 |
| Monomer: DCPD | | | | | | |
| A | 65.0 | | | | | |
| B | | 75.0 | 70.0 | 70.0 | 70.0 | 70.0 |
| C | | | | | | |
| Piperylene | 30.0 | | 25.0 | 25.0 | 25.0 | 15.0 |
| Styrene | 5.0 | | 5.0 | 5.0 | 5.0 | 15.0 |
| 1-Octene | | 25.0 | | | | |

Hypo A = Hypophosphorous Acid
E-323 = ETHANOX 323 (Ethyl Corporation)
PTSA = para-Toluenesulfonic acid
DCPD A = ~95% DCPD, 5% codimers
DCPD B = ~83% DCPD, 15% codimers (modifier)
DCPD C = ~60% DCPD, 15% codimers, 12% Vinyl Aromatic
O-M = Octylmercaptan

TABLE III

| Examples | III | IV | V | VI | VII | VIII | IX |
|---|---|---|---|---|---|---|---|
| Reaction Temperature (°C.) | 265 | 265 | 265 | 265 | 265 | 265 | 250 |
| Reaction Time (hours) | 3 | 6 | 5 | 8 | 6 | 6 | 20 |
| Gardner Color (Base Resin, Neat) | 6– | 4– | 5+ | 4+ | 5+ (Green Hue) | 4 | 3– |

TABLE III-continued

| Examples | III | IV | V | VI | VII | VIII | IX |
|---|---|---|---|---|---|---|---|
| Reaction Yield (%) | 89 | 78 | 89 | 78 | 81 | 84 | 84 |

TABLE IV

| Examples | X | XI | XII | XIII | XIV | XV |
|---|---|---|---|---|---|---|
| Reaction Temperature (°C.) | 265 | 265 | 265 | 265 | 265 | 265 |
| Reaction Time (hours) | 4 | 4 | 6 | 6 | 6 | 6 |
| Gardner Color (Base Resin, Neat) | 5– | 5+ | 5– | 4+ | 4– | 4+ |
| Reaction Yield (%) | 81 | 77 | 81 | 79 | 80 | 87 |

TABLE V

Stripped Resin, Nitrogen Sparge at 230° C.

| Examples | III | IV | V | VI | VII | VIII | IX |
|---|---|---|---|---|---|---|---|
| Gardner Color, Neat | 6– | 5– | 7– | 5 | 6+ (Green) | 5 | 3 |
| S.P. (R&B) | 124 | 90.5 | 142 | 101 | 129 | 123 | 125 |
| Molecular Weight Data | | | | | | | |
| $M_n$ | — | 360 | — | 300 | — | 358 | — |
| $M_w$ | — | 550 | — | 513 | — | 628 | — |
| $M_z$ | — | 920 | — | 998 | — | 1190 | — |
| PDI | — | 1.5 | — | 1.7 | — | 1.7 | — |

TABLE VI

Stripped Resin, Nitrogen Sparge at 230° C.

| Examples | X | XI | XII | XIII | XIV | XV |
|---|---|---|---|---|---|---|
| Gardner Color, Neat | 6– | 6 | 5+ | 5 | 4+ | 5 |
| S.P. (°C.) | 100 | 83 | 104 | 102 | 102 | 103 |
| Molecular Weight Data | | | | | | |
| $M_n$ | — | 427 | — | 337 | 341 | — |
| $M_w$ | — | 640 | — | 578 | 554 | — |
| $M_z$ | — | 1052 | — | 1047 | 1021 | — |
| PDI | — | 1.5 | — | 1.7 | 1.6 | — |
| 2:2:1 EVA/Wax/Resin Cloud Point | | | | 73° | 72° C. | |

EXAMPLES III–XV were representative of the preparation of a dicyclopentadiene resin according to the present invention from light colored DCPD streams. The resulting resins had final colors of from 3 to 7 with weight average molecular weights ranging from 513 to 640. The $M_w/M_n$ ratio varied from 1.5 to 1.7. Thus, the resins prepared according to the present invention had relatively narrow molecular weight distributions, relatively low molecular weights, and relatively light colors.

EXAMPLES XVI–XX

A series of reaction examples are presented in TABLE VII that were prepared from a crude dicyclopentadiene concentrate polymerized substantially in the manner of EXAMPLE I. The reaction results/physical properties are presented in TABLES VIII and IX. These examples further illustrate that the mechanism of the present invention is independent of the source of DCPD. The crude dicyclopentadiene feed contains approximately 60% DCPD by weight at approximately 92% total reactives. This material is amber/green, approximating a Gardner 5 color itself.

TABLE VII

| Examples | Comparison XVI | XVII | XVIII | XIX | XX |
|---|---|---|---|---|---|
| Mw Control Package Monomer: | None | 0.25% Iodine | 0.25% Iodine | 0.2% $H_3PO_4$ | 0.2% $H_3PO_2$ |
| DCPD A | | | | | |
| B | | | | | |
| C | 100.0 | 100.0 | 75.0 | 75.0 | 75.0 |
| alpha-Pinene | | | 25.0 | 25.0 | 25.0 |

TABLE VIII

| Examples | XVI | XVII | XVIII | XIX | XX |
|---|---|---|---|---|---|
| Reaction Temperature (°C.) | 265 | 265 | 265 | 265 | 265 |
| Reaction Time (hours) | 4 | 4 | 4 | 4 | 4 |
| Gardner Color (Base Resin, Neat) | — | — | — | — | — |
| Reaction Yield (%) | 85 | 81 | 60 | 65 | 63 |

TABLE IX

Stripped Resin, Nitrogen Sparge at 230° C.

| Examples | XVI | XVII | XVIII | XIX | XX |
|---|---|---|---|---|---|
| Gardner Color, Neat | 12+ | 18+ | 18+ | 18+ | 11– |
| S.P. (°C.) | 109 | 109 | 94 | 101 | 102 |
| Molecular Weight Data | | | | | |
| $M_n$ | 355 | 314 | 339 | — | — |
| $M_w$ | 982 | 563 | 478 | — | — |
| $M_z$ | 4207 | 1223 | 761 | — | — |
| PDI | 2.8 | 1.8 | 1.4 | — | — |

$H_3PO_4$ = Phosphoric Acid

Comparison EXAMPLE XVI is presented as a control. EXAMPLES XVII, XVIII, XIX and XX involve the addition of the strong acid of the present invention. EXAMPLE XVII illustrates that the use of a hydroiodic acid in accordance with the present invention results in substantially improved molecular weight characteristics as indicated by the significant reduction in the weight average molecular weight and the polydispersity index.

EXAMPLES XVIII, XIX and XX illustrate that the copolymerized system of DCPD concentrate and alpha-pinene results in a very narrow molecular weight as indicated by the 1.4 polydispersity index.

EXAMPLE XX further illustrates that, in addition to the molecular weight controlling feature of the present invention, the color of the final product can be substantially improved by the presence of hypophosphorous acid.

EXAMPLES XXI–XXIV

A series of pressure sensitive adhesives were prepared by combining 25 wt. % of a styrene-isoprene-styrene copolymer thermoplastic elastomer (SOL T 193B, Enichem Corp.) 20 wt. % and 55 wt. % of a resin. In EXAMPLE XXI, the resin was a catalytically polymerized, 95° C. softening point, "C5" hydrocarbon resin (WINGTACK 95, Goodyear Tire and Rubber Co.); in EXAMPLE XXII, the resin was a 100° C. softening point rosin-pentaerythritol ester (SYLVATAC 2100, Arizona Chemical Co.); in EXAMPLE XXIII, the resin was the resin of EXAMPLE VI, and in EXAMPLE XXIV the resin was the resin of EXAMPLE IV.

The adhesives were coated onto a MYLAR (E. I. DuPont de Nemours & Co.) film and tested for tack, 180° peel, shear adhesion failure temperature and 25° C. shear. The results of the tests are shown in TABLE X.

TABLE X

| Example | XXI | XXII | XXIII | XXIV |
|---|---|---|---|---|
| Resin | WINGTACK 95 | SYLVATAC 2100 | Example VI | Example IV |
| Film Thickness (mils) | 1.1 | 1.2 | 1.2 | 1.3 |
| Polyken Probe Tack (grams) | 1485 ± 163 | 1226 ± 255 | 1219 ± 149 | 1224 ± 125 |
| 180° C. Peel (lbs/in) | 5.98 ± .54 | 7.48 ± .17 | 6.57 ± .04 | 5.67 ± .20 |
| Shear Adhesion Failure Temp. (°C.) | 65.6 | 60.0 | 61.7 | 63.9 |
| 25° C. Shear (min.) | >10,000 | >10,000 | >10,000 | >10,000 |

The adhesives prepared from the resins of the present invention (EXAMPLES XXIII and XXIV) performed as well as the adhesives prepared from resins of accepted chemistry. Thus the resins of the present invention are substantially suitable for the production of pressure sensitive adhesives. However, it will be appreciated that resins according to the invention may be produced more economically than conventional resins of this type with improved color and molecular weight characteristics.

EXAMPLES XXV–XXVII

A series of EVA based hot-melts adhesives were prepared and are summarized in TABLE XI. The systems were derived from 20 wt. % EVA I (ELVAX 260, E. I. DuPont de Nemours & Co.), 10 wt. % EVA 2 (ELVAX 410, E. I. DuPont de Nemours & Co.), 30 wt. % Wax (SHELLWAX 300, Shell Chemical Co.) and 40 wt. % resin. In Comparative EXAMPLE XXV, the resin is a commercially available catalytically polymerized aliphatic hydrocarbon resin (STA-TAC B, Arizona Chemical Co.). In EXAMPLE XXVI the resin is the resin from EXAMPLE VI and in EXAMPLE XXVII the resin is the resin from EXAMPLE XV. The systems were melt blended at 175° C. for 2.5 hours under a nitrogen blanket.

The cloud point results indicate greater system compatibility from the resins of the present invention. The resins of the present invention also result in desirably light hot-melt color.

TABLE XI

| Example | XXV | XXVI | XXVII |
|---|---|---|---|
| Resin | STA-TAC B | Example VI | Example XV |
| Resin Softening Point (°C.) | 100 | 101 | 103 |
| Neat Resin Color | 6 | 5– | 5 |
| Hot-Melt Color | 5 | 3 | 3 |
| Viscosity (cps) @ 175° C. | 3850 | 3980 | 4500 |
| Cloud Point (°C.) | 112 | 63 | 63 |
| Yield (lbs./inch) | — | 652 | 675 |

EXAMPLES XXVIII–XXX

Several pigment flushing varnishes were prepared by dissolving 60 wt. % resin in 40 wt. % of an aliphatic ink solvent (MAGIESOL 47, Magie Brother Chemical Company/Pennzoil) at elevated temperature. In EXAMPLE XXVIII, the resin was commercially available catalytically polymerized "C9" resin with a softening point of 140° C. (NEVCHEM 140, Neville Chemical Co.); in EXAMPLE XXIX, the resin was commercially available DCPD based resin with a softening point of about 140° C. (BETAPRENE 255, Arizona Chemical Co.); and in EXAMPLE XXX, the resin was the resin of EXAMPLE V with a softening point of 142° C. The physical properties of the resin varnishes are given in TABLE XII. The varnishes were evaluated in a pigment flushing operation and in an ink/printing evaluation. The printing evaluation was conducted by blending 30 parts of the pigment dispersion with 70 parts of a gel varnish. The results are also shown in TABLE XII.

TABLE XII

| Pigment Flushing and Printing Evaluation | | | |
|---|---|---|---|
| Example Comparative Examples | XXVIII "Cat. C9" Neville NEVCHEM 140 | XXIX Modified DCPD Arizona BETAPRENE 255 | XXX Example V |
| S.P. (°C.) | ~140° C. | ~140° C. | 142° C. |
| Resin % | 60 ————————————> | | |
| Solvent % (MAGIESOL 47 Aliphatic Ink Solvent) | 40 ————————————> | | |
| Viscosity @ 25° C. | Z6.8 191 secs | Z4.0 68 secs | Z1.0 28.5 secs |

TABLE XII-continued

Pigment Flushing and Printing Evaluation

Pigment Flushing Operation:

| | | | |
|---|---|---|---|
| Total Water (grams) | 23.6 | ----------------------------------> | |
| Flushed water (grams) | 19.17 | 19.81 | 19.93 |
| % Pigment | 40.0 | ----------------------------------> | |
| Water Break | <---------------equal---------------> | | |

Ink/Printing Evaluation:

| | | | |
|---|---|---|---|
| 30 parts Flush Color 70 parts Gelled Varnish | | | |
| % Dil. to Tack | 8.13 | 8.13 | 6.63 |
| Ink Gloss | 17.8 | 19.6 | 22.8 |
| Print Density | 1.72 | 1.95 | 1.98 |
| Ink Misting | 3– | 3– | 3– |
| Set-off (min.) | <1 | 1 | 1 |
| Heatset Dry | 1 pass | 1 pass | 1 pass |

The flushing varnish prepared with the resin of the present invention had an advantageously lower viscosity and performed substantially in the manner of the varnishes prepared with the commercially available resins in the flushing operation. The lower solution viscosity afforded by the resin of the present invention is an advantage for ease of handling and mixing.

The print evaluation of ink prepared from the flushed pigment dispersion of the resin of the present invention afforded significantly improved gloss relative to the commercially available products with substantially equal printing characteristics.

EXAMPLES XXXI–XXXII

Two lithographic gel varnishes were prepared by dissolving a high viscosity phenolic modified rosin resin (BECKACITE 6000, Arizona Chemical Co.), an alkyd, and a solubilizing resin in an aliphatic ink solvent (MAGIESOL 47, Magie Brothers Chem. Co.) at 175° C. The solution was then held at 175° C. and AIEM and OAO gelling agents (Chattem Chemical Co.) added. The system was allowed to react at 175° C. for one hour. In EXAMPLE XXXI the solubilizing resin is a commercially available DCPD based resin with a 140° C. softening point (BETAPRENE 255, Arizona Chemical Co.), and in EXAMPLE XXXII, the solubilizing resin is resin from EXAMPLE V with a softening point of 142° C. The theological properties as determined on a Laray Viscometer are presented in TABLE XIII.

TABLE XIII

Gel Varnish Formulation

| | |
|---|---|
| High Viscosity Modified Phenolic Resin (1) | 29.0 parts |
| Solubilizing Hydrocarbon Resin | 20.0 parts |
| Alkyd | 15.0 parts |
| AIEM Solution (2) | 1.0 parts |
| OAO Solution (3) | 2.0 parts |
| MAGIESOL 47, Aliphatic Ink Solvent | 33.0 parts |
| | 100.0 |

Laray Viscometer Gel Rheology Evaluation

| Example Solubilizing | XXXI Arizona Chemical | XXXII Example |
|---|---|---|

TABLE XIII-continued

| Hydrocarbon Resin | Modified DCPD Resin BETAPRENE 255 | V |
|---|---|---|
| Viscosity (cps) | 510 | 429 |
| Yield Value | 15725 | 26395 |
| Shortness Ratio | 30.6 | 61.5 |
| Slope | 1.56 | 1.86 |
| M47 Tolerance | 11 mls. | 10 mls. |

(1) Beckacite 6000, Arizona Chemical Company
(2) AIEM: Chelated Alkoxide
(3) OAO: Oxyaluminum Octoate The resin of EXAMPLE V affords significantly greater gel reactivity as indicated by the shortness ratio of EXAMPLE XXXII. Shortness ratio is a measure of the relative elastic character of the varnish independent of viscosity. The additional reactivity was achieved at substantially equal aliphatic solubility. Traditionally the solubilizing resin deleteriously effected the gel reaction and therefore the exceptional gel strength observed with resin EXAMPLE V is a significant positive result.

Therefore, the present invention provides a method for preparing thermally polymerized resins of dicyclopentadiene which have improved compatibility and solubility characteristics. In addition, the formation of high molecular weight fractions are minimized as is the formation of additional color during the polymerization. Further, resins prepared according to the present invention are useful in preparing adhesives and ink varnishes.

Having thus described various preferred embodiments of the invention and several of its benefits and advantages, it will be understood by those of ordinary skill that the foregoing description is merely for the purpose of illustration and that numerous substitutions, rearrangements and modifications may be made in the invention without departing from the scope and spirit of the appended claims.

What is claimed is:

1. A dicyclopentadiene resin produced according to a thermal polymerization process which comprises heating a reaction material consisting essentially of a cyclopentadiene and/or dicyclopentadiene monomer, and optionally, a modifier selected from the group consisting of ethylene, propylene, 1-butene, isobutylene, butadiene, 1-pentene, 1-hexene, 2-methyl-2-butene, isoprene, 1,3-pentadiene, 1-octene, limonene, α-pinene, β-pinene, styrene, vinyl toluene, α-methyl styrene, indene and mixtures thereof, at a temperature in the range of from about 240° C. to about 320° C. in the presence of a Bronsted acid selected from the group consisting of hypophosphorous acid, p-toluenesulfonic acid, hydrochloric acid, hydroiodic acid, phosphoric acid methane sulfonic acid, and mixtures thereof for a time sufficient to produce a dicyclopentadiene oligomer resin exhibiting a weight average molecular weight ranging from about 260 to about 1000, a cloud point of less than about 100° C. and a saponification value of essentially 0.

2. A dicyclopentadiene resin, said resin being produced according to a thermal polymerization process which comprises:
 (a) placing a starting material in a reaction vessel capable of being sealed and pressurized, the starting material consisting essentially of a dicyclopentadiene concentrate, optionally, a modifier selected from the group consisting of ethylene, propylene, 1-butene, isobutylene, butadiene, 1-pentene, 1-hexene, 2-methyl-2-butene, isoprene, 1,3-pentadiene, 1-octene, limonene, α-pinene, β-pinene, styrene, vinyl toluene, α-methyl styrene, indene and mixtures thereof, and a Bronsted acid selected from the group consisting of hypophosphorous acid, p-toluenesulfonic acid, hydrochloric acid, hydrochloric hydroiodic acid, phosphoric acid methane sulfonic acid, and mixtures thereof;
 (b) sealing the starting material within the reaction vessel; and
 (c) heating and maintaining the temperature of the starting material for a period of time sufficient to cause the dicyclopentadiene to thermally polymerize to form a reaction product comprising a dicyclopentadiene oligomer resin,
wherein the weight average molecular weight of the polymeric resin is less than about 1000, the resin has a color ranging from about 3 to about 7 on the Gardner scale, a ring and ball softening point ranging from about 80° C. to about 180° C., a saponification number of essentially 0 and a cloud point of less than about 100° C.

3. A dicyclopentadiene resin having a cloud point of less than about 100° C., said resin being produced according to a thermal polymerization process which comprises:
 (a) placing a starting material in a reaction vessel capable of being sealed and pressurized, the starting material consisting essentially of:
  (1) from about 60 wt. % to about 99 wt. % of a dicyclopentadiene concentrate, comprising from about 60 to about 100 wt. % dicyclopentadiene,
  (2) from about 0 wt. % to about 40 wt. % of a compound selected from the group consisting of ethylene, propylene, 1-butene, isobutylene, butadiene, 1-pentene, 1-hexene, 2-methyl-2-butene, isoprene, 1,3-pentadiene, 1-octene, limonene, α-pinene, β-pinene, styrene, vinyl toluene, α-methyl styrene, indene and mixtures thereof, and
  (3) from about 0.1 wt. % to about 0.6 wt. % of a Bronsted acid selected from the group consisting of hypophosphorous acid, p-toluenesulfonic acid, hydrochloric acid, hydroiodic acid, phosphoric acid methane sulfonic acid, and mixtures thereof;
 (b) sealing the starting material within the reaction vessel;
 (c) raising the temperature of the starting material to a temperature in a range of from about 240° C. to about 320° C. over a period in the range of from about 45 minutes to about 75 minutes;
 (d) maintaining the temperature of the starting material in a range of from about 240° C. to about 320° C. for a period of time in the range of from about 1 hour to about 40 hours, thereby forming a reaction product including a dicyclopentadiene oligomer resin;
 (e) decreasing the temperature of the reaction product to within a temperature in a range of from about 10° C. to about 50° C. below the temperature to which the starting material was(f) placing the a period of time;
 (f) placing the reaction product under an inert gas atmosphere;
 (g) transferring the reaction product from the vessel to a steam sparging means; and
 (h) sparging the reaction product with steam to a resin softening point in the range of from about 80° C. to about 180° C.,
wherein the weight average molecular weight of the resin is less than about 1000, the z average molecular weight is less than about 2000, the resin has a color ranging from about 3 to about 7 on the Gardner scale, a saponification number of essentially 0 and a ring and ball softening point ranging from about 80° C. to about 180° C.

4. The dicyclopentadiene resin according to claim 3 having a weight average molecular weight in the range of from about 260 to about 1000.

5. A pressure sensitive adhesive comprising:
 an elastomer;
 a mineral oil; and
 a dicyclopentadiene resin according to claim 3 having a weight average molecular weight in the range of from about 260 to about 1000.

6. The pressure sensitive adhesive of claim 5 wherein the elastomer is selected from the group consisting block copolymer thermoplastic elastomers and radial copolymer thermoplastic elastomers.

7. The pressure sensitive adhesive of claim 5 wherein the elastomer is selected from the group consisting of styrene-butadiene-styrene block copolymer and styrene-isoprene-styrene block copolymer.

8. The pressure sensitive adhesive of claim 5 wherein the elastomer comprises from about 15 wt. % to about 50 wt. % of the adhesive, the mineral oil comprises from about 0 wt. % to about 25 wt. % of the adhesive and the resin comprises from about 30 wt. % to about 75 wt. % of the adhesive.

9. A hot melt adhesive comprising:
 an elastomer;
 a wax; and
 a dicyclopentadiene resin according to claim 3 having a weight average molecular weight in the range of from about 260 to about 1000.

10. The hot melt adhesive of claim 9 wherein the elastomer is an ethylene/ethylenically unsaturated ester copolymer.

11. The hot melt adhesive of claim 10 wherein the ester copolymer is an ethylene-vinyl acetate copolymer.

12. The hot melt adhesive of claim 9 comprising from about 20 wt. % to about 50 wt. % of the elastomer, from about 10 wt. % to about 40 wt. % of the wax, and from about 30 wt. % to about 60 wt. % of the dicyclopentadiene oligomer resin.

13. A pigment flushing varnish for use in the preparation of flushed pigment dispersions, the varnish comprising:
 a lithographic ink solvent; and
 a dicyclopentadiene resin according to claim 3 having a weight average molecular weight in the range of from about 260 to about 1000.

14. The pigment flushing varnish of claim 13 wherein the lithographic ink solvent is selected from the group consisting of aliphatic hydrocarbon based solvents and fatty acid ester based solvents.

15. The pigment flushing varnish of claim 13 wherein the lithographic ink solvent is present at a concentration of from about 30 wt. % to about 60 wt. % and the dicyclopentadiene oligomer resin is present at a concentration of from about 70 wt. % to about 40 wt. %.

16. A gelled lithographic ink varnish for use in the preparation of lithographic inks, the varnish comprising:
   high molecular weight resin;
   a lithographic solvent;
   a gelling agent; and
   a dicyclopentadiene resin according to claim 3 having a weight average molecular weight in the range of from about 260 to about 1000.

17. The gelled lithographic ink varnish of claim 16 wherein the gelling agent is an aluminum compound.

18. The gelled lithographic ink varnish of claim 17 wherein the gelling agent is selected from the group consisting of aluminum diisopropoxide acetoacetic ester chelate and oxyaluminum octoate.

19. The gelled lithographic ink varnish of claim 16 wherein the high molecular weight resin is selected from the group consisting of phenolic modified rosin resin, maleic modified rosin resin, and rosin modified hydrocarbon resin.

20. The gelled lithographic ink varnish of claim 16 wherein the high molecular weight resin is present at a concentration of from about 20 wt. % to about 40 wt. %, the gelling agent is present at a concentration of from about 1 wt. % to about 5 wt. %, the lithographic solvent is present at a concentration in the range of between about 10 wt. % to about 50 wt. %, and the dicyclopentadiene oligomer resin is present in a concentration of between about 10 wt. % and about 40 wt. %.

21. The gelled lithographic ink varnish of claim 16 wherein the varnish further comprises an alkyd.

22. The gelled lithographic ink varnish of claim 21 wherein the high molecular weight resin is present at a concentration of from about 20 wt. % to about 40 wt. %, the gelling agent is present at a concentration of from about 1 wt. % to about 5 wt. %, the lithographic solvent is present at a concentration in the range of between about 10 wt. % to about 50 wt. %, the alkyd is present in a concentration of from about 5 wt. % to about 25 wt. %, and the dicyclopentadiene oligomer resin is present in a concentration of between about 10 wt. % and about 40 wt. %.

23. A composition for use in an ink or adhesive comprising:
   an ink solvent or an elastomer; and
   a dicyclopentadiene resin according to claim 3 having a weight average molecular weight in the range of from about 260 to about 1000 and a polydispersity index of less than about 2.3.

* * * * *

UNITED STATES PATENT AND TRADEMARK OFFICE
CERTIFICATE OF CORRECTION

PATENT NO. : 5,691,432
DATED : Nov. 25, 1997
INVENTOR(S) : Theodore Joseph Williams It is certified that error appears in the above-indentified patent and that said Letters Patent is hereby corrected as shown below:

IN THE CLAIMS:

Claim 3, Column 18, line 7, after "starting material was", delete "(f) placing the a period of time" and insert --maintained for a period of time--.

Claim 6, Column 18, line 31, after "group consisting", insert --of--.

At the end of Claim 23, Column 20, after "less than about 2.3", add --and a ring and ball softening point in the range of from about 80°C to about 180°C--.

Signed and Sealed this

Third Day of February, 1998

Attest:

BRUCE LEHMAN

Attesting Officer

Commissioner of Patents and Trademarks